United States Patent [19]

Aspers

[11] 4,333,220

[45] Jun. 8, 1982

[54] METHOD AND APPARATUS FOR TIGHTENING AN ASSEMBLY INCLUDING A PRE-LOAD INDICATING FASTENER

[75] Inventor: Arthur J. Aspers, Williamstown, N.J.

[73] Assignee: SPS Technologies, Inc., Jenkintown, Pa.

[21] Appl. No.: 113,416

[22] Filed: Jan. 18, 1980

[51] Int. Cl.$^{3}$ .................... B23Q 17/00; B23P 19/04

[52] U.S. Cl. .................................... 29/407; 29/240; 73/862.24; 81/467; 364/508; 411/10

[58] Field of Search .................... 29/240, 407; 73/139, 73/761, 862.24; 173/12; 411/10; 307/290, 362; 81/467; 364/505, 507, 5 UG

[56] References Cited

U.S. PATENT DOCUMENTS

| | | | |
|---|---|---|---|
| 3,192,481 | 6/1965 | Pincus | 307/362 X |
| 3,323,403 | 6/1967 | Waisman | 411/10 |
| 3,585,401 | 6/1971 | Karl | 307/362 |
| 3,867,865 | 2/1975 | Dahl . | |
| 3,982,419 | 9/1976 | Boys | 173/12 X |
| 4,041,288 | 8/1977 | Conway et al. | 307/362 X |

FOREIGN PATENT DOCUMENTS

| | | | |
|---|---|---|---|
| 900231 | 7/1962 | United Kingdom | 411/10 |

*Primary Examiner*—Francis S. Husar
*Assistant Examiner*—Carl J. Arbes
*Attorney, Agent, or Firm*—Aaron Nerenberg

[57] ABSTRACT

A method and apparatus for tightening an assembly including a pre-load indicating fastener is disclosed. Pre-load indicating fasteners are generally tightened until a crushable element, forming a portion of the pre-load indicating fastener, is plastically deformed. The present invention permits such fasteners to be tightened until the crushable element of the fastener is completely deformed. This reduces the problem of relaxation generally associated with such fasteners. The present invention permits joints including such fasteners to be tightened by automatic tightening systems, if so desired. The assembly is tightened until the crushable element of the fastener is fully plastically deformed and elastic deformation of the joint has commenced. Sensing means are provided in the automatic tightening system to enable detection of this point and to automatically stop the tightening system when this point is reached.

17 Claims, 5 Drawing Figures

METHOD AND APPARATUS FOR TIGHTENING AN ASSEMBLY INCLUDING A PRE-LOAD INDICATING FASTENER

BACKGROUND OF THE INVENTION

1. Field of the Invention

This invention relates to pre-load indicating fasteners in general and to a method and apparatus for tightening assemblies including such fasteners, in particular.

There are many situations when it is desired to tighten a particular joint assembly to a desired pre-load. In many situations such tightening is accomplished through the use of torque wrenches. However, due to the variation between torque and pre-load in the joint as a result of friction, this method is unsatisfactory in those areas where a high degree of accuracy is required. Pre-load indicating (hereinafter referred to as PLI) fasteners are commonly used when a high degree of accuracy is required with respect to tightening a joint assembly to a particular pre-load. PLI fasteners generally include a crushable element which is initially loaded when the fastener is tightened. There is a direct relationship between the desired pre-load and the yield point of the crushable element which can be calculated in advance. The yield point of the crushable element is predetermined in a number of ways including material selection and design configuration.

2. Description of the Prior Art

PLI fasteners are well known in the prior art. PLI fasteners include nut and bolt assemblies and washers with crushable or otherwise yielding elements.

U.S. Pat. No. 3,867,865 TWO-PART, TWO-MATERIAL FASTENING ELEMENT by Norman C. Dahl, issued Feb. 25, 1975 discloses a PLI bolt and PLI nut. Dahl teaches a crushable element in both the nut and the bolt, which is made of a material that is different from the primary load carrying structure of the nut or bolt.

U.S. Pat. No. 3,323,403 PRE-LOAD INDICATING WASHER by J. L. Waisman, issued June 6, 1967 teaches a PLI washer assembly. Waisman teaches one embodiment wherein a crushable washer is inserted between a bolt head and its adjacent structure. He also teaches another embodiment wherein two concentrically oriented washers are positioned between the bolt and its adjacent structure. The inner washer is the crushable element while the outer washer is a primary load carrying member. This second embodiment of Waisman has found heavy usage in practice, particularly for aerospace applications.

When initially tightening the dual washer assembly of Waisman the inner washer is loaded while the outer washer is not loaded and is rotatable due to a gap between the two washers. Initial tightening of the fastener causes the inner washer to be loaded in its elastic range. Subsequent tightening causes the inner washer to be loaded beyond its yield point causing it to plastically deform and be compressed outwardly and downwardly. During tightening the operator manually checks to see if the outer washer is free to rotate. Tightening is stopped when the outer washer is no longer free to rotate, indicating that sufficient plastic deformation of the inner washer has occurred.

Although PLI fasteners represent a considerable advance over tightening joint assemblies by monitoring the torque applied to the fastener during tightening, there have been problems associated with them. PLI fasteners are tightened using manual systems. The operator of such systems ceases to tighten when he feels the fastener enter the plastic range of the crushable element. This has resulted in two distinct problems.

When such PLI systems are manually tightened the operator stops tightening when he is sure that he is in the plastic range. This point is highly subjective and varies between individual operators as well as by an individual operator from joint to joint. The operator does not continue to tighten after he senses plastic deformation of the crushable element, since if he did so he would possibly enter the elastic range of the joint assembly. This would be undesirable as it would constitute an over-tightening of the joint assembly. Additionally, the operator would have no way of knowing to what extent he had tightened the joint assembly into its elastic range. Variation in bolt tension can be as much as ±7 percent of the bolt tension when the fastener assembly is tightened within the range of plastic deformation of the crushable element. In many instances this variation is greater than would otherwise be desired.

A second problem associated with prior art PLI fasteners is that of relaxation. As previously indicated, in tightening such fasteners the crushable element is only partially plastically deformed. This will, of course, result in a reduction of the static load being carried by the bolt. This represents a loosening or reduction in tightness of the assembled joint and is undesirable. In some applications it may result in the joint assembly having a significantly decreased propensity for enduring dynamic loading, thus increasing the potential of fatigue failure.

A third problem associated with PLI fasteners is that they have heretofore not lent themselves to automatic tightening systems. Most conventional tightening systems, as previously indicated, are based upon tightening the fastener until a preselected degree of torque resistance is met. These systems are, of course, not acceptable for tightening PLI fasteners since the primary purpose of the PLI fasteners is to eliminate the lack of precision provided by such torque tightening systems.

U.S. Pat. No. 3,982,419 APPARATUS FOR AND A METHOD OF DETERMINING ROTATIONAL AND LINEAR STIFFNESS, issued to John T. Boys on Sept. 28, 1976, teaches an automatic tightening system which is not based upon shut off at a torque value. The Boys system tightens until the gradient of the torque-rotation curve (i.e. the rate of change of torque with respect to angular rotation) reaches a predetermined relationship at the yield point of the joint assembly being tightened. The present invention includes a modification to this system which enables assemblies including PLI fasteners to be tightened until the crushable element of the PLI fastener is fully deformed and the joint assembly has been tightened slightly into its elastic region. The teachings in U.S. Pat. No. 3,982,419 are incorporated herein by reference.

SUMMARY OF THE INVENTION

The present invention generally includes the method of tightening a PLI fastener until the crushable element has fully deformed plastically. In particular, the invention includes the method of tightening a PLI fastener until the gradient or slope of the torque versus angle of rotation curve indicates entry into the region of the curve depicting elastic deformation of the joint assembly. The invention also includes a modification to tightening systems of the type which tighten until a particular relationship of the rate of change of torque with respect to angular rotation is reached, so that entry into the elastic range of the joint assembly may be established.

Accordingly, it is an object of the present invention to tighten an assembly including a PLI fastener until its crushable element is fully plastically deformed.

It is another object of the present invention to provide a method of tightening an assembly including a PLI fastener until the joint assembly has begun to deform elastically.

It is a further object of the present invention to provide means for tightening an assembly including a PLI fastener until its crushable element has deformed plastically to the extent that a significant portion of the load is transferred to the non-deforming element of the fastener.

Another object of the present invention is to provide means for tightening an assembly including a PLI fastener until the elastic region of the joint assembly is reached.

It is another object of the present invention to provide for tightening of an assembly including a PLI fastener in order to reduce relaxation in the joint assembly.

It is still another object of the present invention to provide for tightening an assembly including a PLI fastener to a more accurate predetermined pre-load.

It is still a further object of the present invention to automatically tighten an assembly including a PLI fastener until its crushable element is fully deformed plastically.

It is still a further object of the present invention to automatically tighten an assembly including a PLI fastener until the joint assembly begins to deform elastically.

Other objects and a fuller understanding of the present invention will be had by reference to the following description the specification and in claims of the preferred embodiment thereof, taken in conjunction with the accompanying drawings wherein like reference numerals refer to like or similar parts throughout.

DESCRIPTION OF THE PREFERRED EMBODIMENTS

Figure 1:
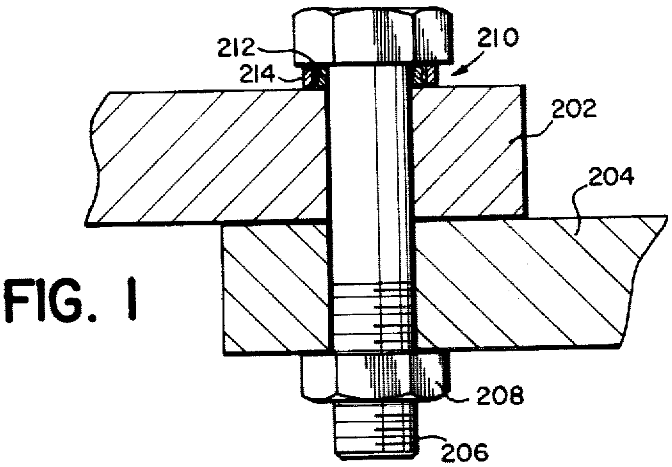
FIG. 1 is an elevational view, partially broken away, of a completed joint assembly using a PLI fastener in accordance with the present invention.

Referring now to FIG. 1, a conventional joint assembly including a threaded fastener is shown. Two members, 202 and 204 are shown assembled to one another by a bolt 206, a nut 208, and a PLI washer assembly 210. The PLI washer assembly 210 includes an inner washer 212 and an outer washer 214. It is to be understood that the PLI fastener in this instance includes the bolt 206, the nut 208 and the PLI washer assembly 210. The PLI washer assembly 210 is essentially one which is described in the previously referred to Waisman patent. The PLI washer assembly which is described herein is considered to be representative of PLI fasteners having a crushable element. It should be understood that any one of a number of other PLI fasteners with crushable elements known in the current state of the art exhibiting similar torque vs. angle of turning characteristics when tightened may be substituted for the PLI washer assembly shown and described herein. The invention therefore applies equally well to such other PLI fasteners in general and, in particular, to PLI fasteners having a crushable element incorporated in the bolt or nut structure. Members 202 and 204 are intended to be representative of any two members which are to be joined to one another by a fastener, such as the bolt 206, nut 208 and PLI washer assembly 210.

Figure 2:
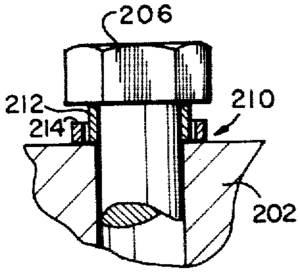
FIG. 2 is a partial view of the joint assembly shown in FIG. 1 prior to tightening.

Referring now to FIG. 2, the bolt 206 is shown initially in contact with the PLI washer assembly 210 before tightening. The bolt head is shown in contact with the inner crushable washer 212. In FIG. 1 the bolt 206 is shown in its final tightened state wherein the inner washer 212 is fully plastically deformed.

Figure 3:
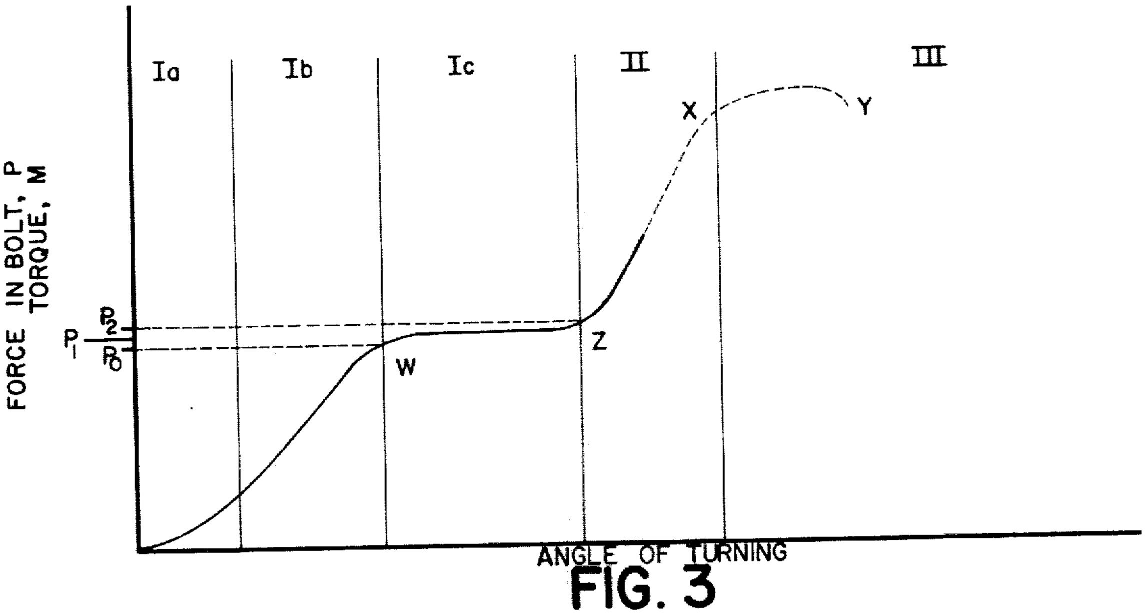
FIG. 3 is a typical curve of torque or force plotted against angle of turning experienced by an assembly including a PLI fastener during a tightening cycle and graphically illustrating an underlying principle of the invention.

The torque required to tighten a threaded PLI fastener assembly is a function of many variables including the joint stiffness, the fastener stiffness, the surface friction in the threads and the thread form. the general characteristic showing the relationship between torque and angle of turning of such a fastener is illustrated by the curve in FIG. 3, which shows the torque plotted against angle of turning for a threaded PLI fastener assembly in a typical application. The slope or gradient of the curve at any point is a function of the aforementioned variables, but can vary widely even with a fastener of a given configuration due to friction conditions in the joint.

The torque versus angle of turning curve shown in FIG. 3 may be divided into the following regions:

I*a* An initial pretightening region;

I*b* A tightening region wherein the crushable element or inner washer 212 is elastically compressed;

I*c* A region of yield or plastic deformation of the crushable element or inner washer 212;

II A tightening region wherein elastic deformation of the joint assembly occurs; and III A region of yield or plastic deformation of the joint assembly and subsequent failure of the bolt.

In region I*a* initial tightening of the bolt 206 and the nut 208 occurs along with initial compression of the inner washer 212 of the PLI washer assembly 210. Region I*b* corresponds to the elastic compression of the inner washer 212. In region I*c* plastic deformation of the inner washer 212 occurs. If tightening were to continue into region II the joint assembly, including the bolt 206 would elastically deform. Further tightening into region III would result in plastic deformation of the joint assembly, including the bolt 206, and its subsequent failure at point Y.

In non-PLI fastener assemblies, regions I*b* and I*c* are not applicable. In such non-PLI fastener systems, as described in the Boys patent, it is desired to tighten the fastener assembly to the transition point X between regions II and III, or to the yield point of the joint assembly.

However, as previously indicated, the objective in using PLI fasteners is to tighten the joint assembly, including the bolt 206, to a predetermined load $P_1$. This is accomplished by appropriately designing the crushable element of the PLI fastener. In the present embodiment of the invention the inner washer 212 and its relationship to the outer washer 214 must be properly designed to deform at a known load. In the tightening methods of the prior art, tightening has been generally stopped in region Ic. However, the precise load P in the bolt 206 could fall anywhere within the range of $P_0$ to $P_2$, where $P_0$ is the load at which plastic deformation of the crushable element commences, and $P_2$ is the load at which elastic deformation of the joint assembly occurs. Since it is known that an operator tightening a PLI fastener will generally stop tightening the fastener at a point between $P_0$ and $P_2$, the crushable element of the fastener is designed so that $P_1$ will occur somewhere between $P_0$ and $P_2$, generally the midpoint therebetween.

The present invention includes the method of tightening the PLI fastener until its crushable element (in the washer 212 in the present embodiment) is at approximately point Z in FIG. 3, where elastic deformation of the joint assembly commences. Point Z, by definition, occurs at a load $P_2$ in the bolt. PLI fasteners of the present invention are tightened to point Z in order to obtain the previously indicated advantages. This is accomplished by apparatus which will be subsequently described.

When existing PLI fasteners are tightened in accordance with prior art manual tightening methods, the bolt will be loaded to a point at approximately $P_1$, which is between $P_0$ and $P_2$, as previously discussed. When using an existing PLI fastener that is rated for a load $P_1$, in accordance with the present invention, it will be tightened to point Z with the result that the bolt will be under a load $P_2$. Accordingly, fasteners which are tightened in accordance with the present invention must be designed or rated so that the desired bolt loading will be substantially equal to $P_2$.

Figure 4:
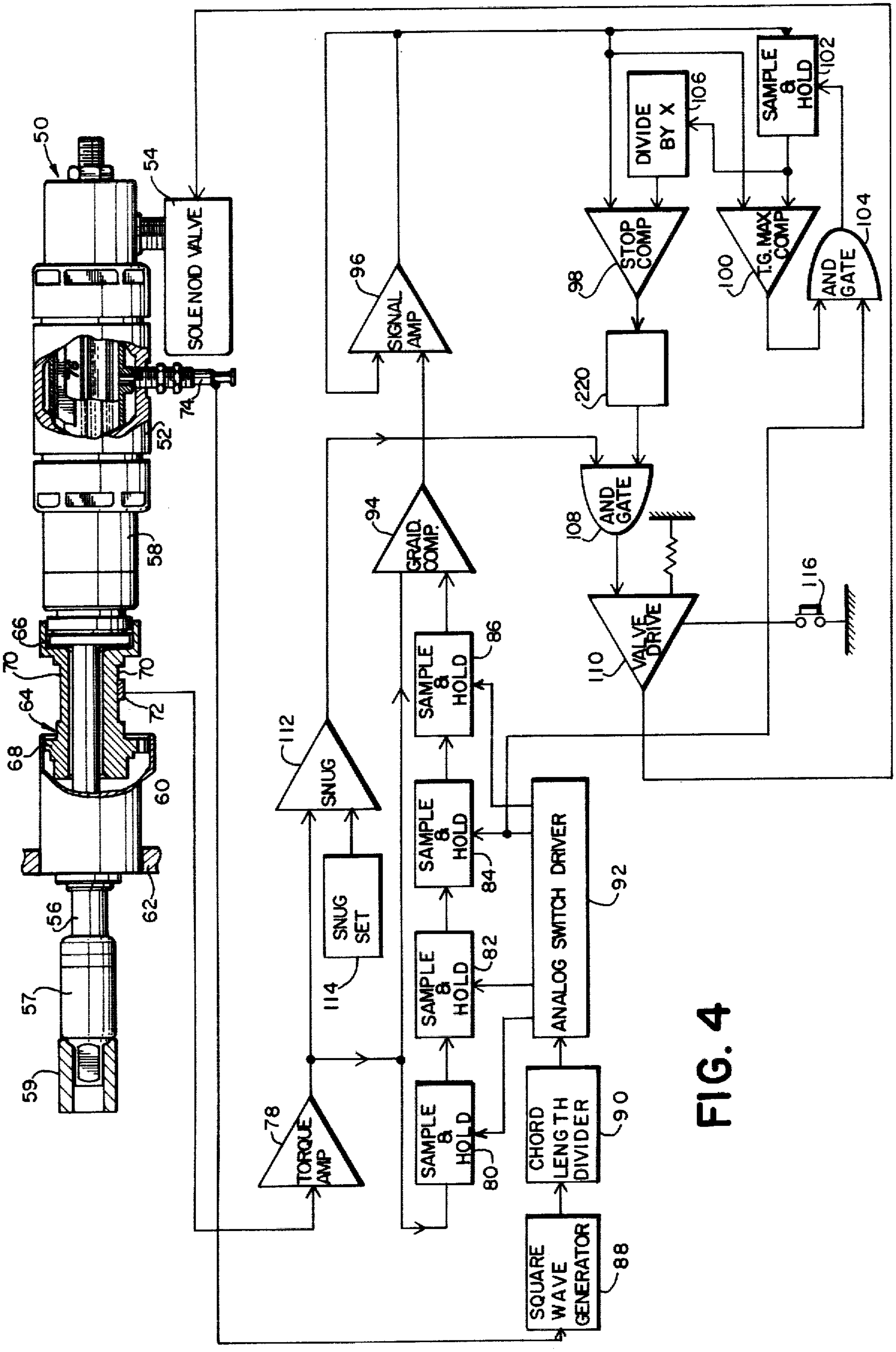
FIG. 4 is a schematic representation of the apparatus of the present invention including a logic device.

A tightening system for tightening PLI fasteners to point Z is shown in FIG. 4. This system is a modification of the apparatus described in the Boys patent to accomplish the tightening of assemblies including PLI fasteners to point Z in FIG. 3. As shown in FIG. 4 the apparatus comprises a wrench 50 including an air motor 52, the operation of which is controlled by a suitable solenoid valve 54, and which drives an output shaft 56 through a speed-reducing gear box 58 so that the output shaft does not rotate at the same high speed as the motor. Output shaft 56 carries an adapter 57 for attachment with a driver bit 59 and is mounted in a suitable rotary bearing assembly 60 facilitating rotation of and taking up any bending stresses in the output shaft. Bearing assembly 60 may be mounted on a rigid frame 62, but use of the frame is not necessary for the practice of the invention. At this point it should be noted that while motor 52 has been described as an air motor, it may be of any suitable type, for example electric, hydraulic or any combination of pneumatic electric or hydraulic. It should also be noted that the apparatus thus far described is generally conventional and need not be explained in greater detail.

Located between gear box 58 and bearing assembly 60 is transducer means in the form of a torque cell 64 which develops a signal representative of the instantaneous torque being applied to the fastener. Torque cell 64 includes a first mounting base 66 securing the cell to gear box 58 and a second mounting base 68 securing it to bearing assembly 60. Extending axially of the wrench between mounting bases 66 and 68 are a plurality of strut members 70 which are somewhat deformable, that is, are relatively rigid members capable of twisting somewhat about the axis of the wrench. When wrench 50 is operative to tighten a fastener, the reaction torque action thereon causes strut member 70 to twist about the axis of the wrench, the amount of twist being proportional to the reaction torque which of course, is equal to and opposite the torque being applied to the fastener. Each strut member 70 carries a strain gauge 72 which is connected in a wheatstone bridge circuit (not shown) to develop an electric signal representative of the instantaneous torque being applied to the fastener. Instead of strain gauges, contacting or proximity displacement gauges could be used to develop the electric signal. The exact form of torque cell 64, of course, may vary somewhat. For example, struts 70 could be replaced by a somewhat deformable cylindrical member, if desired.

A proximity probe 74 is mounted through the housing of motor 52 adjacent to and radially spaced from rotary vanes 76 in the motor. Proximity probe 74 can be in the form of an induction coil which develops an electrical signal when metal passes through its magnetic field. Thus, as vanes 76 rotate when the fastener is being tightened, signals are provided by proximity probe 74 which represent fixed increments of rotation of the fastener. The size of the increments depends on the number of vanes 76 in motor 52 and the gear ratio of gear box 58. It should be understood, of course, that a proximity probe could cooperate with one of the gears in gear box 58 in a similar manner.

The output signal from torque cell 64 representative of the instantaneous torque being applied to the fastener is fed through a torque amplifier 78 which amplifies the torque signal to a magnitude wherein it is compatible with the rest of the control system. From amplifier 78, the torque signal is fed through shift register means which, since the circuit is analog, comprises a series of charge coupled devices in the form of sample and hold circuits 80, 82, 84 and 86. The gradient shift register means is clocked by signals representative of fixed angular increments of displacement of the fastener. Accordingly, signals from proximity probe 74 which are in the form of spike shaped pulses are fed through a square wave generator 88 which shapes the signals and feeds the shaped signals through a chord length divider 80 to an analog switch driver 92 which sequentially clocks the sample and hold cicuits which electronically divide the pulses from square wave generator 88 by 1, 2, 4, 8, 16 or 32 so that every pulse, or every second pulse, or every fourth pulse, etc. is utilized to clock the shift register. By selecting the appropriate division to be made in chord length divider 90, it is possible to adjust the chord length on the Torque-Angle of Turning curve over which the torque gradient is measured.

Analog switch driver 92, although not necessary, assures that each sample and hold circuit has discharged its stored signal before receiving a new signal. Accordingly, analog switch driver 92 sequentially clocks the sample and hold circuits first clocking circuit 86, then circuit 84, then circuit 82, and finally circuit 80. Accordingly, sample and hold circuit 86 has discharged its stored signal prior to receiving a new signal from sample and hold circuit 84, etc. The output from sample and hold circuit 86 is representative of torque a fixed increment of rotation prior to that particular instant and is fed through a gradient register or comparator circuit 94 in the form of a differential amplifier which also receives an input signal representative of the instantaneous torque being applied to the fastener from torque amplifier 78. Comparator 94 subtracts its input signals and has an output signal representative of the instantaneous torque gradient for the particular fastener being tightened. The gradient signal from comparator 94 is fed through a suitable gradient signal amplifier 96 which amplifies it to a magnitude compatible with the rest of the control system.

From gradient signal amplifier 96, the instantaneous gradient signal is fed to means for determining the maximum gradient and also to means for comparing the maximum and instantaneous gradient signals. Looking first at the means for determining the maximum gradient, there is included a maximum gradient comparator 100 receiving input signals from gradient signal amplifier 96 and from a sample and hold circuit 102 which also receives signals from gradient signal amplifier 96. As will be made clear hereinafter, sample and hold circuit 102 stores a signal representative of the maximum gradient encountered up to any point in the tightening cycle prior to the instantaneous output from the gradient signal amplifier. Comparator 100 determines whether the intantaneous gradient signal from gradient signal amplifier 96 or the previously stored signal from sample and hold circuit 102 is larger. If the instantaneous gradient signal is larger, comparator 100 feeds an output signal to an AND gate 104 which also receives signals from analog switch driver 92 when the switch driver outputs a clocking signal to sample and hold circuit 84. When both signals are received by AND gate 104, it outputs a clocking signal to sample and hold circuit 102 which allows the sample and hold circuit to receive a new signal from gradient signal amplifier 96 representative of the larger gradient. If the instantaneous gradient is smaller, comparator 100 provides no output, nor does AND gate 104 so that sample and hold circuit 102 cannot accept a new gradient signal. By utilizing the clocking signal from analog switch driver 92 to sample and hold circuit 84, a time lag is provided which allows the comparison to be made before a clocking signal can be fed through AND gate 104 and before a new gradient signal can be developed.

Looking now at the means for comparing the maximum and instantaneous gradient signals, it can be seen that as the signal representative of the maximum gradient is fed from sample and hold circuit 102 to comparator 100 it is split and fed to a division circuit 106 which is operative to divide the signal by the preset relationship utilized to determine the point W on the curve illustrated in FIG. 3. If the preset relationship is 66⅔%, as is preferred, dividing circuit 106 divides the maximum stored gradient signal from sample and hold circuit 102 to the desired level and feeds the divided maximum gradient signal to a control comparator 98 so that it can be compared with an instantaneous gradient signal from gradient signal amplifier 96 which is also fed to the control comparator 98. When the input signals to control comparator 98 are essentially equal, or when the gradient signal is smaller than the divided maximum gradient signal, the control comparator 98 provides an output signal which is fed to the input of a two shift register 220.

Figure 5:
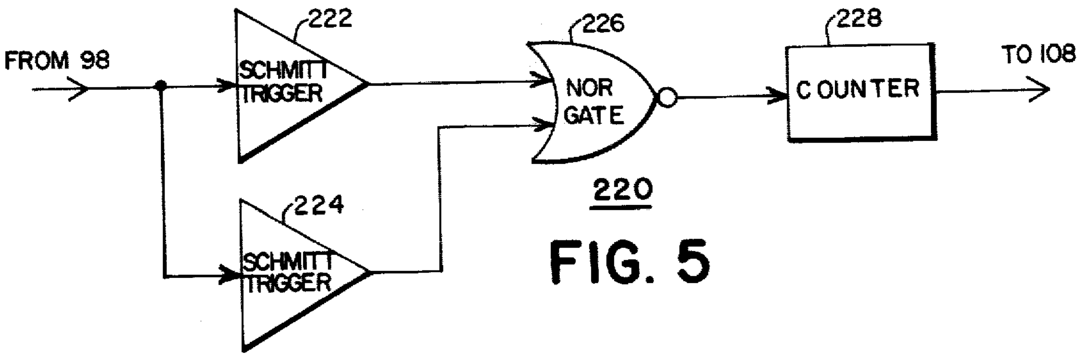
FIG. 5 is a particular part of the logic device of FIG. 4 shown in greater detail.

Referring now to FIG. 5, the two shift register 220 is shown in greater detail. Schmitt triggers 222 and 224, which form a portion of the two shift register 220, each receive the output signal from the control comparator 98. The output of comparator 98 remains on until the gradient signal becomes larger than the divided maximum gradient signal. Schmitt triggers 222 and 224 are designed in a manner which allows one to respond to an increase and the other to respond to a decrease in the magnitude of the output from comparator 98. The Schmitt triggers 222 and 224 are designed in such a manner that they are AC coupled and function as differentiation amplifiers. A positive swing of the comparator 98 provides a positive pulse from trigger 222 while a negative swing of the comparator 98 produces a negative pulse from trigger 224. A NOR gate 226 receives the output signals from Schmitt triggers 222 and 224 and provides an output pulse of a suitable level to a counter 228 when each of the Schmitt triggers 222 and 224 produces a pulse when driven by the comparator 98 as described above. The counter 228 is of conventional design and provides an output to AND gate 108 when a total of two pulses have been provided to it by NOR gate 226.

The two shift storage register 220 provides a stop command to AND gate 108 only after the force exerted on the assembly including the PLI fastener being tightened as shown, for example, in FIGS. 1 and 2, reaches a level corresponding to completion of plastic deformation of its crushable member. This represents point Z in FIG. 3 and is the initiation of elastic deformation of the joint assembly.

It should be noted that the output signal from the two shift register 220 could be fed directly through a valve drive amplifier 110 which would amplify the signal to a suitable magnitude to close the solenoid valve 54 and thereby stop motor 52. However, to assure that shift register 220 does not inadvertently provide an output signal in region Ia of the curve illustrated in FIG. 1, AND gate 108 is utilized and receives an additional input signal from a snug torque comparator 112. Instantaneous torque signals are fed from torque amplifier 78 to snug torque comparator 112 which also receives an input signal form a preset snug torque signal generator 114 which may be in the form of a suitable potentiometer for providing a predetermined input signal representative of the torque value at the point marking the transition from region Ia to region Ib on the curve illustrated in FIG. 3. The noted point is commonly referred to as the snug point or snug torque point. The setting in snug torque signal generator 114 need not be exactly representative of the snug point and may be an approximation, for example, a signal representative of about 20% of the torque value expected at the yield point W of the crushable element would suffice. When the instantaneous torque signal from amplifier 78 exceeds that generated by snug torque signal generator 114, comparator 112 provides an output signal to AND gate 108 which allows the feeding of the signal from the two shift register 220 to valve drive amplifier 110. The output of valve drive amplifier 110 is fed to solenoid control valve 54, closing the valve and stopping motor 52. Thus, any signals inadvertently developed by control comparator 98 in the pretightening region, that is region Ia of the curve illustrated in FIG. 3 would not provide a pulse to shift register 220 which would have the effect of closing control valve 54 prematurely.

Finally, a reset switch 116 is provided which can be utilized to clear the circuits and prepare the tool for a new tightening operation with another fastener. One other point that should be noted involves the fact that various predetermined relationships can be utilized to determine when to stop the tightening cycle depending on the characteristic of the torque-rotation curve. For example, if the curve included a temporary flattening at a known load less than the load at the yield point, the tool could be utilized to stop tightening at that point. Such a temporary flattening of the curve could be caused by a particular PLI fastener configuration.

In the foregoing, there has been disclosed several embodiments of the invention and it should be obvious to one skilled in the art that various modifications and changes can be made without departing from the true spirit and scope of the invention as recited in the appended claims.

What is claimed is:

1. A method of tightening a joint assembly including a pre-load indicating fastener having a crushable element, the tightening curve of the assembly exhibiting an elastic and a plastic region each for the crushable element and for the joint, comprising the steps of:

applying torque and rotation to the fastener;

developing a changing signal representative of the torque gradient of the torque imparted to the fastener with respect to the rotation thereof;

determining the largest torque gradient developed up to any point and storing an information signal representative thereof;

comparing said stored information signal and said gradient signal and developing a control signal indicative of the commencement of plastic deformation of the crushable element when said gradient signal has changed to a predetermined percentage of said information signal;

continuing to apply torque and rotation after said control signal indicates commencement of said plastic deformation of the crushable element; continuing to compare said stored information signal and said gradient signal and continuing to develop said control signal until said control signal indicates the commencement of elastic deformation of the joint; and ceasing to apply torque and rotation when said control signal indicates the commencement of elastic deformation of the joint, whereby the crushable element is fully plastically deformed.

2. A method in accordance with claim 1 wherein said control signal is developed when said gradient signal has dropped to substantially 66⅔% or less of said information signal.

3. A method in accordance with claim 2 wherein said control signal is developed by determining the torque imparted to said fastener and determining the change in torque at constant intervals of angular rotation of said fastener.

4. A method in accordance with claim 2 wherein said control signal is developed when said gradient signal has dropped to between approximately 25% to 75% of said information signal.

5. A method of determining the yield point or a similarly significant point of the torque-rotation curve of an assembly including a pre-load indicating fastener, having a crushable element, the torque-rotation curve of the assembly exhibiting an elastic and a plastic region each for the crushable element and for the joint, comprising the steps of:

applying torque and rotation to the fastener;

developing a changing signal representative of the torque gradient of the curve which could be plotted for the torque imparted to the fastener with respect to the rotation thereof;

determining the torque gradient in the generally linear portion of said curve and storing an information signal representative thereof;

comparing said stored information signal and said gradient signal and developing a control signal indicative of the commencement of plastic deformation of the crushable element when said gradient signal has changed to a predetermined percentage of said information signal;

continuing to apply torgue and rotation after said control signal indicates commencement of said plastic deformation of the crushable element; continuing to compare said stored information signal and said gradient signal and continuing to develop said control signal until said control signal indicates the commencement of elastic deformation of the joint; and ceasing to apply torque and rotation when said control signal indicates that portion of the curve has been reached indicating commencement of elastic deformation of the assembly, whereby the crushable element is fully plastically deformed.

6. Apparatus for tightening a joint assembly including a pre-load indicating fastener having a crushable element, the torque-rotation curve of the assembly exhibiting an elastic and a plastic region each for the crushable element and for the joint, which comprises:

first means for imparting torque and rotation to the fastener;

second means connected to said first means for detecting significant changes in the slope of the torque-rotation curve of the assembly and generating a control signal indicative thereof;

third means responsive to said control signal for ignoring said control signal when said control signal indicates the commencement of plastic deformation of the crushable element and for responding to said control signal when said control signal indicates commencement of elastic deformation of the joint assembly, whereby the crushable element is fully plastically deformed and fourth means responsive to said third means for causing said first means to cease to import said torque and rotation to the fastener.

7. Apparatus for tightening an assembly including a pre-load indicating fastener having a crushable element, the torque-rotation curve of the assembly exhibiting an elastic and a plastic region each for the crushable element and for the joint, which comprises:

first means for imparting torque and rotation to said fastener;

second means connected to said first means for developing a signal representative of the instantaneous gradient of the torque-rotation curve through which the assembly is being tightened;

third means responsive to said gradient signal for determining a significant change in slope following a tightening region on the torque-rotation curve through which the assembly is being tightened, said third means including means for storing a signal representative of the gradient of the torque-rotation curve throughout the tightening region thereof and for developing a control signal when said instantaneous gradient signal is a predetermined percentage of said stored signal;

fourth means responsive to said control signal for ignoring said control signal when said control signal indicates the commencement of plastic deformation of the crushable element and for responding to said control signal when said control signal indicates commencement of elastic deformation of the joint, whereby the crushable element is fully plastically deformed and fifth means responsive to said fourth means for causing said first means to cease to import torque and rotation to said fastener.

8. Apparatus for tightening an assembly including a pre-load indicating fastener having a crushable element until a significant point of the torque-rotation curve for the assembly has been reached, the torque-rotation curve of the assembly exhibiting an elastic and a plastic region each for the crushable element and for the joint, said apparatus comprising:

wrenching means for imparting torque and rotation to said fastener assembly;

means for developing a signal representative of the instantaneous torque imparted to said fastener assembly;

means for developing a signal representative of the angular rotation of said fastener assembly;

means responsive to said torque signal and said rotation signal for developing a signal representative of the instantaneous torque gradient of the torque-rotation curve through which said fastener assembly is being tightened;

means responsive to one of said signals having a certain relationship relative to said torque gradient signal through the tightening region of said torque-rotation curve for developing a control signal;

means responsive to said control signal for ignoring said control signal when said control signal indicates the commencement of plastic deformation of the crushable element and for responding to said control signal when said control signal indicates commencement of elastic deformation of the joint, whereby the crushable element is fully plastically deformed; and stopping means responsive to said last-mentioned means for causing said wrenching means to cease to impart torque and rotation to said fastener assembly.

9. Apparatus for tightening a fastener assembly in accordance with claim 8 wherein said one of said signals is the torque gradient signal.

10. Apparatus for tightening a fastener assembly in accordance with claim 9 wherein said means for developing said torque gradient signal includes means for determining the largest torque gradient signal developed up to any point and wherein said means for developing said control signal includes means for comparing said largest torque gradient signal and said instantaneous torque gradient signal.

11. Apparatus for tightening a fastener assembly in accordance with claim 10 wherein said control signal is a predetermined percentage of said largest torque gradient signal.

12. Apparatus for tightening a fastener assembly in accordance with claim 11 wherein said predetermined percentage is any percentage substantially $66\frac{2}{3}\%$ or less.

13. Apparatus for tightening a fastener assembly in accordance with claim 11 wherein said means for determining the largest gradient signal developed up to any point includes storage means for storing the largest gradient signal so far developed and comparator means for comparing said stored gradient signal with said instantaneous gradient signal and providing an output signal when said instantaneous gradient signal is larger than said stored gradient signal, said comparator means output signal being said larger instantaneous gradient signal and said storage means receiving said comparator means output signal.

14. Apparatus in accordance with claims 7, 8 or 9 wherein said means responsive to said control signal includes, a pair of Schmitt triggers each responsive to opposite polarities, each of which Schmitt triggers receive said control signal, gate means connected to each of said triggers; and a counter, connected to said gate means.

15. Apparatus in accordance with claim 14 wherein said gate means is a NOR gate.

16. Apparatus in accordance with claim 14 wherein said counter develops an output signal when it has received two signals from said gate means.

17. Apparatus in accordance with claim 15 wherein said counter develops an output signal when it has received two signals from said NOR gate.

* * * * *